United States Patent
Ono

(10) Patent No.: US 9,619,181 B2
(45) Date of Patent: Apr. 11, 2017

(54) INFORMATION PROCESSING DEVICE AND METHOD FOR CONTROLLING REPLACEMENT OF SEMICONDUCTOR STORAGE DEVICE

(71) Applicant: FUJITSU LIMITED, Kawasaki-shi, Kanagawa (JP)

(72) Inventor: Takatsugu Ono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 102 days.

(21) Appl. No.: 14/183,987

(22) Filed: Feb. 19, 2014

(65) Prior Publication Data
US 2014/0297926 A1   Oct. 2, 2014

(30) Foreign Application Priority Data

Mar. 28, 2013  (JP) ................................. 2013-070675

(51) Int. Cl.
*G06F 3/06*   (2006.01)

(52) U.S. Cl.
CPC .......... *G06F 3/0688* (2013.01); *G06F 3/0607* (2013.01); *G06F 3/0616* (2013.01); *G06F 3/0649* (2013.01); *G06F 3/0653* (2013.01)

(58) Field of Classification Search
CPC ..... G06F 3/0688; G06F 3/0649; G06F 3/0616
See application file for complete search history.

(56) References Cited

U.S. PATENT DOCUMENTS

2007/0283079 A1   12/2007   Iwamura et al.
2011/0213916 A1   9/2011    Fujibayashi et al.
(Continued)

FOREIGN PATENT DOCUMENTS

JP   2007-115232   5/2007
JP   2007-323224   12/2007
JP   2013-20544    1/2013

OTHER PUBLICATIONS

Japanese Office Action dated Oct. 25, 2016 in corresponding Japanese Patent Application No. 2013-070675.

*Primary Examiner* — David X Yi
*Assistant Examiner* — Zubair Ahmed
(74) *Attorney, Agent, or Firm* — Staas & Halsey LLP

(57) ABSTRACT

A processor or hard-wired logic circuit of an information processing device is configured to collect a life-expectancy index value of a first semiconductor storage device of primary semiconductor storage devices. The life-expectancy index value relates to a remaining number of times written data is able to be erased. The processor or hard-wired logic circuit is configured to collect read/write information regarding read/write access including read access of reading data from the first semiconductor storage device and write access of writing data to the first semiconductor storage device. The processor or hard-wired logic circuit is configured to determine, based on the collected read/write information, a criterion threshold used as a criterion for replacement of the first semiconductor storage device, and replace the first semiconductor storage device with a second semiconductor storage device of secondary semiconductor storage devices if the life-expectancy index value is less than the criterion threshold.

14 Claims, 10 Drawing Sheets

(56) References Cited

U.S. PATENT DOCUMENTS

| | | | |
|---|---|---|---|
| 2012/0284587 A1* | 11/2012 | Yu | G06F 3/0608 |
| | | | 714/773 |
| 2012/0317342 A1* | 12/2012 | Choi | G06F 12/0246 |
| | | | 711/103 |
| 2013/0019122 A1 | 1/2013 | Daikokuya et al. | |
| 2014/0201576 A1* | 7/2014 | Wu | G06F 11/3058 |
| | | | 714/47.2 |

* cited by examiner

FIG. 2
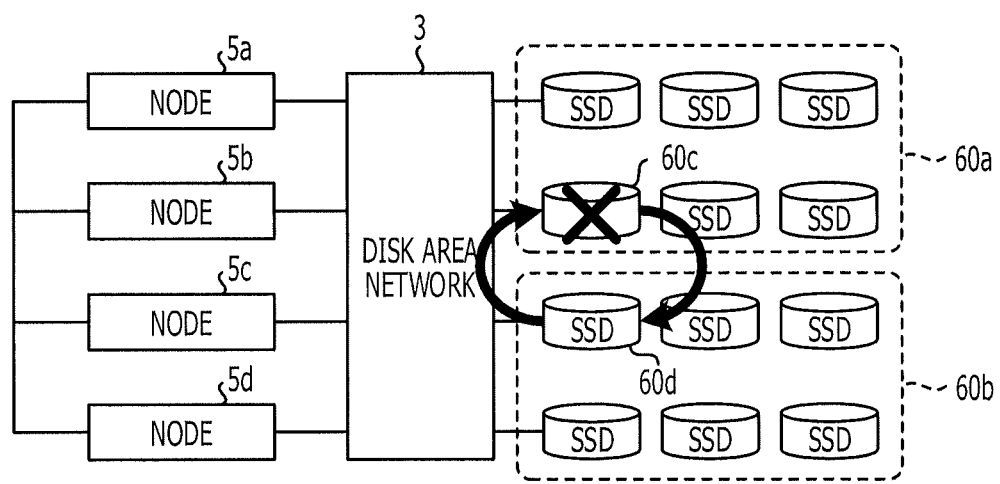
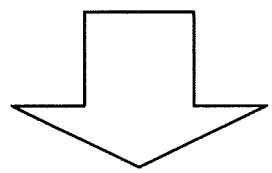
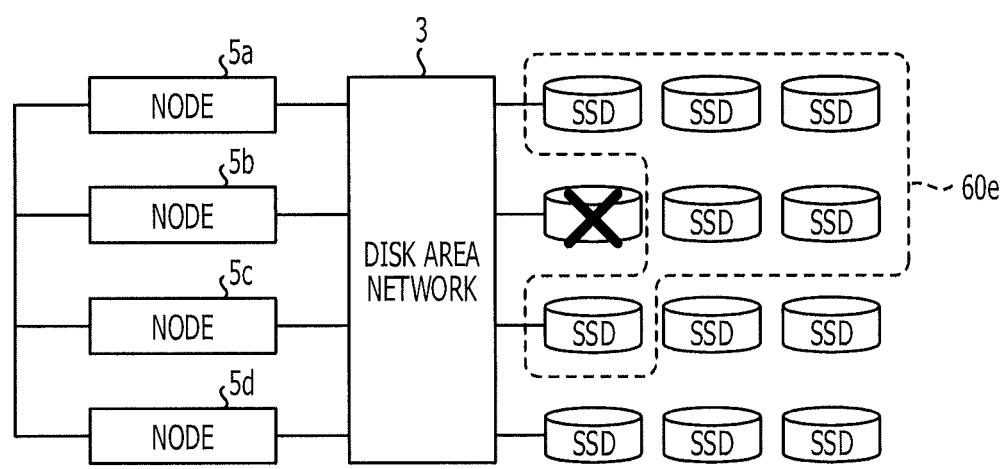

| SSD ID | CONNECTION DESTINATION | LIFE EXPECTANCY |
|---|---|---|
| SSD#0 | NODE 5a | 100 |
| SSD#1 | NODE 5b | 80 |
| SSD#2 | -(NOT CONNECTED) | 50 |
| ... | | |

| NODE ID | PROGRAM EXECUTION FLAG | RATIO |
|---|---|---|
| NODE 5a | 1 (EXECUTING) | 50:50 |
| NODE 5b | 1 (EXECUTING) | 90:10 |
| NODE 5c | 0 (NOT EXECUTING) | NULL |
| ... | | |

INFORMATION PROCESSING DEVICE AND METHOD FOR CONTROLLING REPLACEMENT OF SEMICONDUCTOR STORAGE DEVICE

CROSS-REFERENCE TO RELATED APPLICATION

This application is based upon and claims the benefit of priority of the prior Japanese Patent Application No. 2013-070675, filed on Mar. 28, 2013, the entire contents of which are incorporated herein by reference.

FIELD

The embodiments discussed herein are related to an information processing device and a method for controlling replacement of a semiconductor storage device.

BACKGROUND

To date, an information processing device that uses a storage device including a nonvolatile semiconductor as storage is known. As an example of such an information processing device, an information processing device that uses a solid state drive (SSD) having NAND type flash memory as storage is known.

In NAND type flash memory, writing and reading is performed in units of pages each of which contains a plurality of memory cells for retaining data, and erasure of data is performed in units of blocks each of which contains a plurality of pages. The memory cell, however, is degraded each time data is rewritten, and therefore becomes incapable of normally recording information when rewriting of data is performed many times. For this reason, if data is frequently rewritten to the same memory cell, the memory cell becomes incapable of normally recoding information. As a result, a block containing the memory cell that has become incapable of normally recording information becomes a defective block.

To address this, a technique of wear leveling is known. In wear leveling, the numbers of times data is written to memory cells and the numbers of times data is erased are made uniform, so that occurrence of a defective block is inhibited and the lifetime of an SSD is improved. For example, an SSD to which the technique of wear leveling is applied causes the numbers of updates of the entire memory cells included in the SSD to be uniform by moving data stored in a block where updating is performed frequently to a block where the number of updates is small.

A related technique is disclosed in, for example, Japanese Laid-open Patent Publication No. 2007-323224.

The technique of wear leveling mentioned above, however, does not thoroughly solve restrictions on the number of times data is written and the number of times data is erased in one SSD, but only prolongs the lifetime of the SSD. For this reason, it is impossible for an information processing device to continue to use one SSD without consideration of the number of times data is written and the number of times data is erased in a flash memory.

SUMMARY

According to an aspect, provided is an information processing device including a plurality of semiconductor storage devices from and to which data is read and written and a processor or hard-wired logic circuit. The processor or hard-wired logic circuit is configured to collect a life-expectancy index value of a first semiconductor storage device of primary semiconductor storage devices. The life-expectancy index value relates to a remaining number of times written data is able to be erased. The processor or hard-wired logic circuit is configured to collect read/write information regarding read/write access including read access of reading data from the first semiconductor storage device and write access of writing data to the first semiconductor storage device. The processor or hard-wired logic circuit is configured to determine, based on the collected read/write information, a criterion threshold used as a criterion for replacement of the first semiconductor storage device. The processor or hard-wired logic circuit is configured to replace the first semiconductor storage device with a second semiconductor storage device of secondary semiconductor storage devices if the life-expectancy index value is less than the criterion threshold.

The aspect will be realized and attained by the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an illustration for explaining processing performed by the information processing device according to the first embodiment;

FIG. 4 illustrates an example of a life-expectancy management table;

FIG. 5 illustrates an example of a workload management table;

DESCRIPTION OF EMBODIMENTS

Embodiments of an information processing device and a method for controlling replacement of a semiconductor storage device will be described in detail below with reference to the drawings. It is to be noted that the disclosed technique is not limited to the embodiments. The embodiments may be combined appropriately to the extent not inconsistent herewith.

First Embodiment

Figure 1:
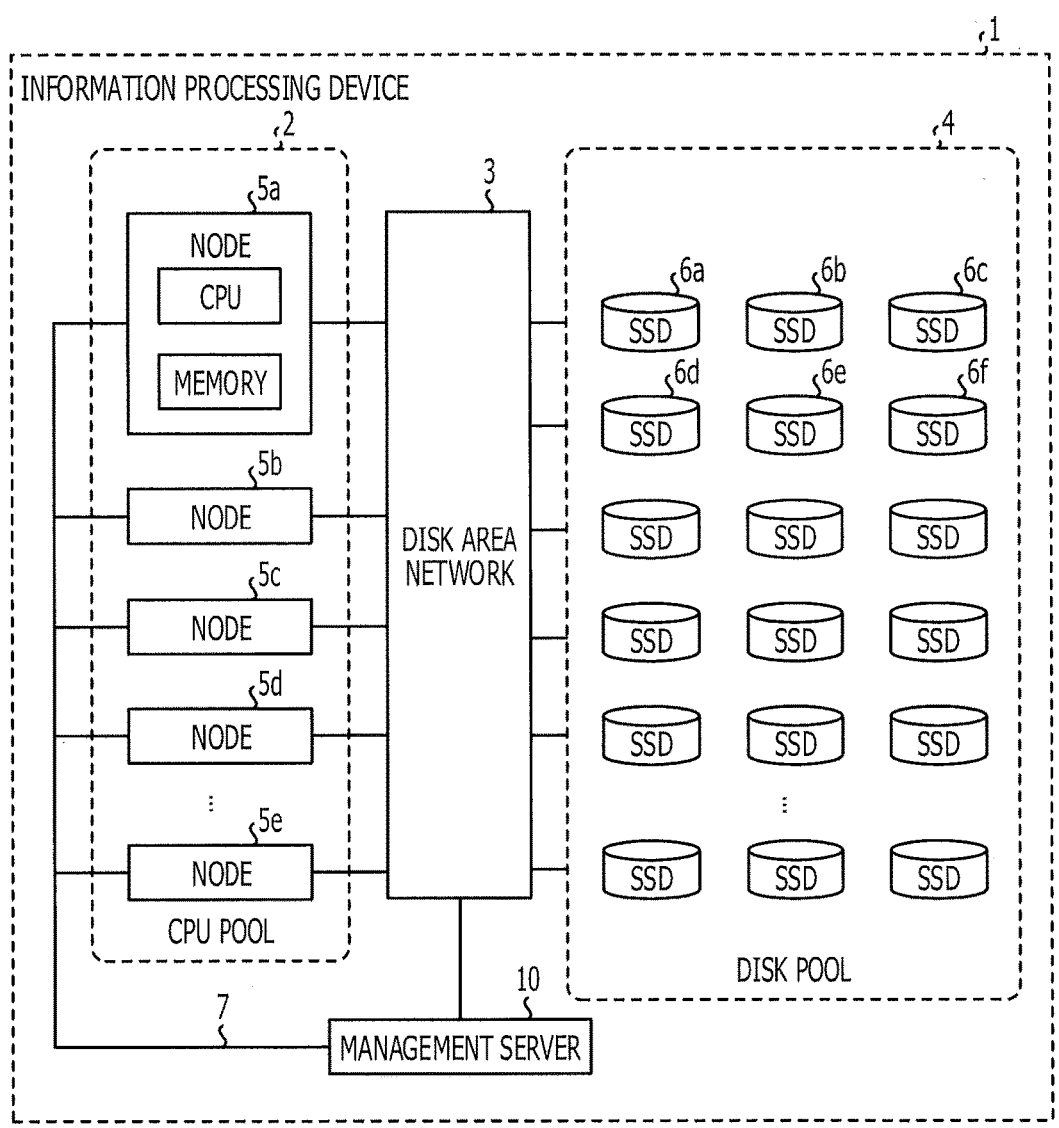
FIG. 1 is a block diagram illustrating an information processing device according to a first embodiment.

With reference to FIG. 1, an information processing device according to a first embodiment will be described below. FIG. 1 is a block diagram illustrating an information processing device according to the first embodiment. As illustrated in FIG. 1, the information processing device 1 includes a central processing unit (CPU) pool 2, a disk area network 3, a disk pool 4, a management network 7, and a management server 10.

The CPU pool 2 contains a plurality of nodes 5a to 5e. Here, the node 5a is a device including a CPU and a memory and being capable of implementing various application programs independently or in conjunction with other nodes, and is, for example, a server board on which a CPU and a memory are mounted. Note that, assuming that the nodes 5b to 5e perform functions similar to those of the node 5a, description given below will not be repeated.

The disk pool 4 contains a plurality of SSDs 6a to 6f. Note that it is assumed that, as illustrated in FIG. 1, the disk pool 4 contains a plurality of SSDs in addition to the SSDs 6a to 6f. Each of the SSDs 6a to 6f is a semiconductor storage device that is used when the nodes 5a to 5e execute application programs, and has a life expectancy based on the number of times data is erased. For example, among the SSDs 6a to 6f, the life-expectancy index value, which is an index value of the life expectancy, is "100" for a semiconductor storage device in which erasure of data is not performed, and the life expectancy index value is "0" for an SSD in which data is erased many times and that has reached the end of its life.

The disk area network 3 is a network that connects each of the nodes 5a to 5e and an SSD used when each of the nodes 5a to 5e executes an application program. For example, in accordance with a specification from the management server 10, the disk area network 3 establishes or closes connection between the node 5a and one or more arbitrary SSDs included in the disk pool 4.

In such a configuration, the node 5a executes an application program using arbitrary SSDs among SSDs contained in the disk pool 4. For example, the node 5a executes an application program using the SSD 6a and the SSD 6b.

The management server 10 is connected through the management network 7 to each of the nodes 5a to 5e. Then, if the node 5b executes an application program in order to provide a new service, for example, the management server 10 instructs the disk area network 3 to establish connection between the SSD 6d and the node 5b. As a result, using the SSD 6d, the node 5b may execute an application program to provide various kinds of services.

In this way, using the plurality of nodes 5a to 5e and the SSDs 6a to 6f contained in the disk pool 4, the information processing device 1 may execute an arbitrary number of application programs to provide various kinds of services. For example, the information processing device 1 may combine the nodes 5a and 5b with the SSDs 6a and 6b so as to provide a Web service, and may combine the nodes 5c to 5e with the SSDs 6c and 6d so as to provide a service of large-scale data processing.

The SSD 6a includes nonvolatile semiconductor memory such as NAND type flash memory and phase change memory (PCM). The nonvolatile semiconductor memory has data cells that have restrictions on the number of times data is erased and the number of times data is written. For example, in a single level cell (SLC) mode in which one data cell stores one bit of data, the number of times data is erased is limited to about 10,000. In a multi-level cell (MLC) mode in which one data cell stores more than one bit of data, the number of times data is erased is limited to about 100,000.

In such a manner, there is a limitation on the number of times data is erased, for memory cells included in the SSD 6a, and therefore the SSD has a lifetime. For this reason, the information processing device 1 collects life-expectancy index values based on the remaining numbers of times each of the SSDs 6a to 6f will be able to erase data. For example, the information processing device 1 collects the values of Media_Wearout_Indicator as the life expectancies utilizing smartmontools. If the life expectancy of an SSD used by each of the nodes 5a to 5e falls short of a predetermined threshold, the information processing device 1 changes the currently used SSD to another SSD. That is, the information processing device 1 performs wear leveling for each of the SSDs 6a to 6f contained in the disk pool 4. This enables the information processing device 1 to use SSDs as storage without consideration of their lifetimes.

FIG. 2 is an illustration for explaining processing performed by an information processing device according to the first embodiment. For example, SSDs in an SSD group 60a are SSDs that the nodes 5a and 5b use for execution of an application program. That is, the information processing device 1 causes the nodes 5a and 5b and the SSD group 60a to operate in combination as one system. SSDs in an SSD group 60b are SSDs not in use.

If the life expectancy of the SSD 60c falls short of a predetermined threshold, the information processing device 1 logically replace the SSD 60c with the SSD 60d. That is, the information processing device 1 changes connection of the disk area network 3 so as to close connection between the nodes 5a and 5b and the SSD 60c and connect the nodes 5a and 5b to the SSD 60d. As a result, the nodes 5a and 5b continuously executes an application program using the SSD group 60e.

When the life expectancy of the SSD 6a is short, for example, although accessing to the SSD 6a that involves erasure of data in memory cells, such as writing of data, has a possibility of causing a malfunction, accessing to the SSD 6a that does not involve erasure of data, such as reading of data, may be accepted. Accordingly, the information processing device 1 collects the amount of data read and the amount of data written per unit period of time when each of the nodes 5a to 5e executes an application program. The information processing device 1 calculates a proportion of the amount of the read data to sum of the amounts of the read data the written data, and calculates a proportion of the amount of the written data to the sum.

Then, the information processing device 1 judges the property of an application program on the basis of the calculated proportions. Thereafter, the information processing device 1 determines a threshold for judging whether to replace an SSD depending on the judged property of the application program, and replaces the SSD if the life expectancy of any of the SSDs 6a to 6f is shorter than the determined threshold.

If an application program performed by the node 5a is judged to have a read-intensive property in which reading of data is frequently performed, the information processing device 1 determines that the value of a threshold is "10". For example, the information processing device 1 judges that an application program is read-intensive when the proportion of the amount of the read data is larger than a predetermined threshold. The information processing device 1 may judge that an application program is read-intensive when the proportion of the amount of the read data is larger than the proportion of the amount of the written data. Then, the information processing device 1 replaces the SSD 6a used by the node 5a with another SSD if the life expectancy of the SSD 6a used by the node 5a is shorter than "10".

Alternatively, the information processing device 1 may judge the tendency of read/write access to an SSD. For example, the information processing device 1 judges that read/write access to an SSD has a read-intensive tendency in which reading of data is frequently performed, when the proportion of the amount of the read data is larger than a predetermined threshold. The information processing device 1 may judge that read/write access to an SSD is read-intensive when the proportion of the amount of the read data is larger than the proportion of the amount of the written data. If read/write access to an SSD is judged to be read-intensive, the information processing device 1 may directly determine a threshold of "10" for judging whether to replace an SSD, and then may replace the SSD if the life expectancy of any of the SSDs 6a to 6f is shorter than a determined threshold.

If an application program performed by the node 5a is judged to have a write-intensive property in which writing of data is frequently performed, the information processing device 1 determines that the value of a threshold is "30". For example, the information processing device 1 judges that an application program is write-intensive when the proportion of the amount of the written data is larger than a predetermined threshold. The information processing device 1 may judge that an application program is write-intensive when the proportion of the amount of the written data is larger than the proportion of the amount of the read data. If the property of the application program is write-intensive, the information processing device 1 sets the threshold to a value larger than the threshold determined in the case where the property of the application program is read-intensive. Then, if the life expectancy of the SSD 6a used by the node 5a is shorter than "30", the information processing device 1 replaces the SSD 6a used by the node 5a with another SSD.

Alternatively, the information processing device 1 may judge the tendency of read/write access to an SSD. For example, the information processing device 1 judges that read/write access to an SSD has a write-intensive tendency in which writing of data is frequently performed, when the proportion of the amount of the written data is larger than a predetermined threshold. The information processing device 1 may judge that read/write access to an SSD is write-intensive when the proportion of the amount of the written data is larger than the proportion of the amount of the read data. If read/write access to an SSD is judged to be write-intensive, the information processing device 1 may directly determine a threshold of "30" for judging whether to replace an SSD, and then may replace the SSD if the life expectancy of any of the SSDs 6a to 6f is shorter than the determined threshold.

At the time when the node 5a only uses the SSD 6a, if the life of the SSD 6a expires, the node 5a will not be able to perform processing during replacement of the SSD 6a with another SSD. Additionally, only replacing the SSD 6a used by the node 5a with the SSD 6d causes a loss of data used by the node 5a. As a result, the node 5a is not able to continuously perform processing.

To address such issues, in the information processing device 1, each of the nodes 5a to 5e constructs redundant arrays of inexpensive disks (RAID)-1 using two SSDs, and performs data mirroring for duplexing. For example, the node 5a uses the SSD 6a and the SSD 6b in which data has been copied by mirroring using the RAID-1 configuration. Then, in the case of replacing the SSD 6a used by the node 5a with the SSD 6d, the information processing device 1 closes connection between the SSD 6a and the node 5a, and replicates data of the SSD 6a to the SSD 6d. Then, the information processing device 1 establishes connection between the SSD 6d to which data has been replicated, and the node 5a.

In a period of time from the closure of connection to the SSD 6a to the establishment of connection to the SSD 6d, the node 5a performs processing described below. That is, when writing data, the node 5a buffers data to be written to a memory; when reading data, the node 5a reads data from the SSD 6b to which the node 5a is connected. Then, upon establishment of connection to the SSD 6d, the node 5a reflects the data buffered in the memory into the SSD 6b and the SSD 6d. Therefore, the information processing device 1 may replace an SSD without causing each of the nodes 5a to 5e to suspend execution of an application program.

Figure 3:
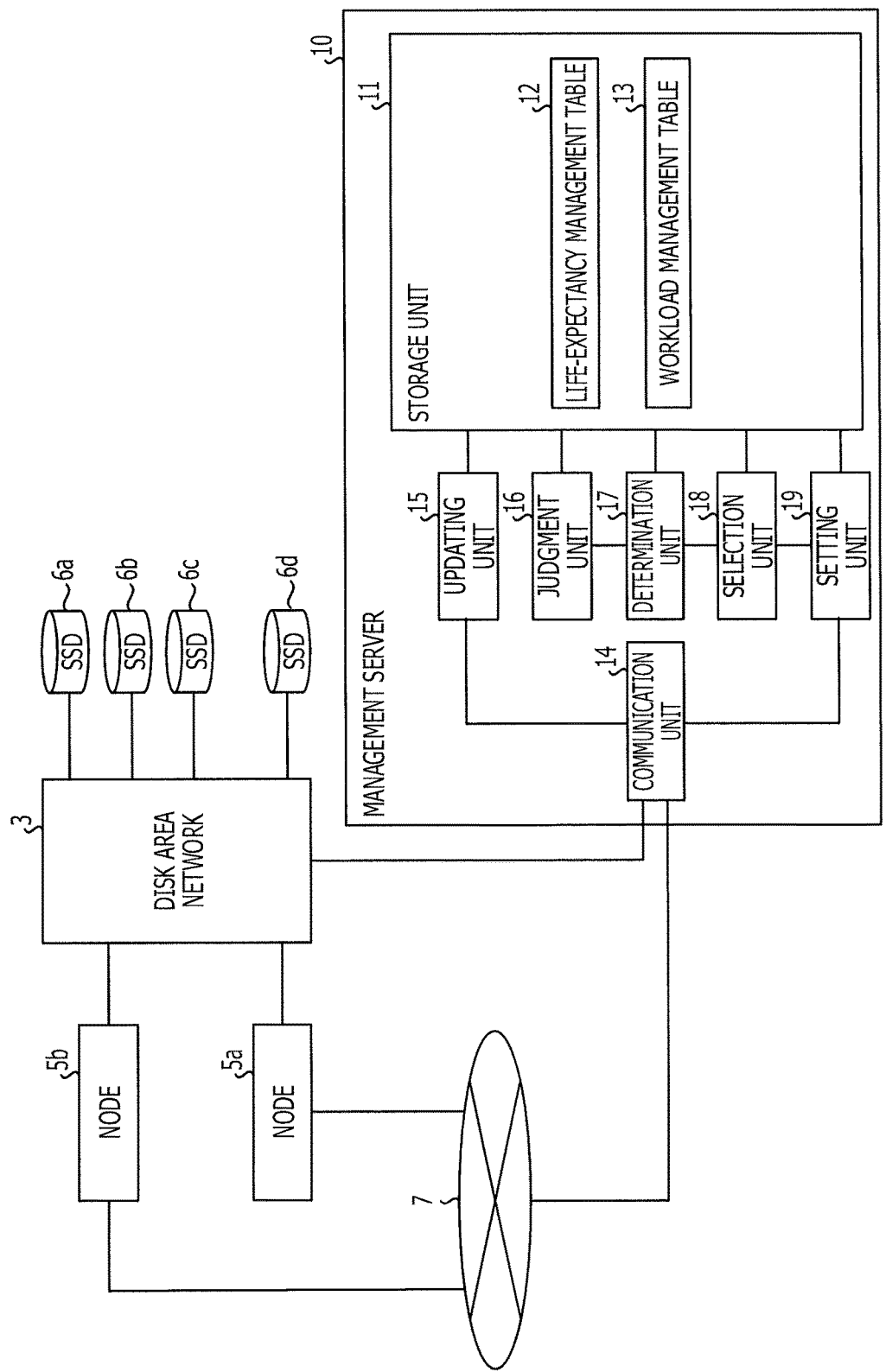
FIG. 3 is a block diagram for explaining a functional configuration of a management server according to the first embodiment.

Then, with reference to FIG. 3, a functional configuration of the management server 10 will be described. FIG. 3 is a block diagram for explaining the functional configuration of the management server according to the first embodiment. Note that, in the example illustrated in FIG. 3, the nodes 5a and 5b among the nodes 5a to 5e included in the information processing device 1 and the SSDs 6a to 6d among the SSDs included in the information processing device 1 are illustrated.

As illustrated in FIG. 3, the management server 10 includes a storage unit 11, a communication unit 14, an updating unit 15, a judgment unit 16, a determination unit 17, a selection unit 18, and a setting unit 19. The storage unit 11 stores a life-expectancy management table 12 and a workload management table 13. The functions of the updating unit 15, the judgment unit 16, the determination unit 17, the selection unit 18, and the setting unit 19 may be realized by a dedicated hard-wired logic circuit or a processor executing a program. The processor is, for example, a CPU, a micro processing unit (MPU), a digital signal processor (DSP), an application specific integrated circuit (ASIC), or a programmable logic device (PLD). The processor may be a combination of two or more elements of the CPU, the MPU, the DSP, the ASIC, and the PLD.

With reference to FIGS. 4 and 5, information stored in the life-expectancy management table 12 and the workload management table 13, which are stored in the storage unit 11, will be described below. First, with reference to FIG. 4, an example of information stored in the life-expectancy management table 12 is described. FIG. 4 illustrates an example of a life-expectancy management table. As illustrated in FIG. 4, the life expectancy of each of the SSDs 6a to 6f is stored in the life-expectancy management table 12. In particular, SSD identifiers (IDs), connection destinations, and life expectancies are stored in association with one another in the life-expectancy management table 12. Here, the SSD ID is an identifier for identifying each of the SSDs 6a to 6f. The connection destination is information indicating a node to which an SSD indicated by the associated SSD ID is connected. The life expectancy is the life expectancy of the SSD identified by the associated SSD ID.

For example, in the example illustrated in FIG. 4, the life-expectancy management table 12 stores that, for the SSD having an SSD ID of "SSD #0", the node 5a is connected thereto and the life expectancy thereof is "100". The life-expectancy management table 12 stores that, for the SSD having an SSD ID of "SSD #1", the node 5b is connected thereto and the life expectancy thereof is "80". The life-expectancy management table 12 stores that, for the SSD having an SSD ID of "SSD #2", none of the nodes 5a to 5e is connected thereto and the life expectancy thereof is "50".

Then, with reference to FIG. 5, information stored in the workload management table 13 is described. FIG. 5 illustrates an example of a workload management table. As illustrated in FIG. 5, ratio between data read from an SSD in use and data written thereto at the time when each of the nodes 5a to 5e executes an application program are stored in the workload management table 13.

In particular, node IDs, program execution flags, and ratio are stored in association with one another in the workload management table 13. Here, the node ID is an identifier for identifying each of the nodes 5a to 5e. The program execution flag is a flag indicating whether a node identified by the node ID associated therewith is executing a program. The ratio is information indicating a ratio of the proportion (%) of the amount of data (byte) read by a node identified by the node ID associated therewith to the proportion (%) of the amount of data (byte) written by that node for one second.

For example, the workload management table 13 stores information to the effect that the node 5a is executing an application program, and that the ratio of the amount of data read by the node 5a to the amount of data written by the node 5a is "50:50". The workload management table 13 stores information to the effect that the node 5b is executing an application program, and that the ratio of the amount of data read by the node 5b to the amount of data written by the node 5b is "90:10". The workload management table 13 stores information to the effect that the node 5c is not executing an application program and therefore the ratio is "null".

With reference back to FIG. 3, the communication unit 14 controls communication between the management server 10 with each of the nodes 5a to 5e via the management network 7 and instructions to the disk area network 3. In particular, the communication unit 14 controls communication of the updating unit 15 and the setting unit 19 with each of the nodes 5a to 5e. The communication unit 14 also controls instructions from the setting unit 19 to the disk area network 3.

The updating unit 15 updates the life-expectancy management table 12 and the workload management table 13 stored in the storage unit 11 at predetermined time intervals. For example, each of the nodes 5a to 5e acquires the value of Media_Wearout_Indicator using smartmontools at predetermined time intervals and sends the acquired value of Media_Wearout_Indicator as a life-expectancy index value to the management server 10 while associating the life-expectancy index value with the SSD ID. Each of the nodes 5a to 5e also acquires the amount of the read data to the amount of written data by an arbitrary approach such as a sar command of Linux (registered trademark), calculates the ratio based on the acquired amounts of data, and sends the calculated ratio to the management server 10. Each of the nodes 5a to 5e notifies the management server 10 of startup of an application program when the application program is started, and sends the termination of an application program to the management server 10 when execution of the application program is terminated.

The updating unit 15 receives an SSD ID, a life-expectancy index value, and a ratio from each of the nodes 5a to 5e. The updating unit 15 updates the life-expectancy management table 12 on the basis of the received SSD ID and life-expectancy index value, and updates the workload management table 13 using the received ratio.

For example, upon receipt of an SSD ID of "SSD #0" and a life expectancy of "50" from the node 5a, the updating unit 15 extracts, from the life-expectancy management table 12, an entry in which the SSD ID of "SSD #0" is stored. Then, the updating unit 15 updates the connection destination of the extracted entry to "node 5a", and updates the life expectancy to "50". When receiving a ratio of "40:60" from the node 5a, the updating unit 15 also extracts an entry in which a node ID of "node 5a" is stored, from the workload management table 13. Then, the updating unit 15 updates the ratio of the extracted entry to "40:60".

When notified of startup of an application program from the node 5a, the updating unit 15 also extracts an entry in which the node ID of "node 5a" is stored, from the workload management table 13, and updates the program execution flag of the extracted entry to "1". When notified of termination of the application program from the node 5a, the updating unit 15 also extracts an entry in which the node ID of "node 5a" is stored, from the workload management table 13, and updates the program execution flag of the extracted entry to "0".

The judgment unit 16 judges the property of an application program executed by each of the nodes 5a to 5e, based on the ratio of read data to written data stored in the workload management table 13. For example, referring to the workload management table 13, the judgment unit 16 acquires the ratio of read data to written data for each of the SSDs 6a to 6f.

Then, the judgment unit 16 judges that the application program is read-intensive if the proportion of read data is larger than a predetermined threshold. The judgment unit 16 also judges that the application program is write-intensive if the proportion of read data is smaller than the predetermined threshold. Note that when the proportion of read data is larger than the proportion of written data, the judgment unit 16 may judge that the application program is read-intensive.

For example, when information illustrated in FIG. 5 is stored in the workload management table 13, the judgment unit 16 performs processing described below. For example, because the proportion of read data is larger than the proportion of written data when the node 5b executes an application program, the judgment unit 16 judges that the application program executed by the node 5b is read-intensive.

For the case where the node 5a executes an application program, the proportion of read data and the proportion of written data are the same. For such a case, in consideration of the stability of the system, the judgment unit 16 may judge that the application program executed by the node 5a is write-intensive. Note that if the judgment unit 16 judges the property of the application program, the judgment unit 16 notifies the determination unit 17 of the judgment result.

Note that the judgment unit 16 may judge the tendency of read/write access to each of the SSDs 6a to 6f, without judging the property of the application program, and notifies the determination unit 17 of the judgment result.

The determination unit 17 determines a threshold used as a criterion for replacement of an SSD, on the basis of the property of an application program executed by each of the nodes 5a to 5e. For example, the determination unit 17 receives, from the judgment unit 16, a notification to the effect that the application program executed by the node 5a is write-intensive. In such a case, the determination unit 17 sets the threshold used as a criterion for an SSD used by the node 5a to "30", and gives the selection unit 18 a notification to the effect that the threshold used as a criterion for replacement of an SSD used by the node 5a is "30".

The determination unit 17 receives, from the judgment unit 16, a notification to the effect that the application program executed by the node 5b is read-intensive. In such a case, the determination unit 17 sets the threshold used as a criterion for an SSD used by the node 5b to "10", and notifies the selection unit 18 to the effect that the threshold used as a criterion for replacement of an SSD used by the node 5b is "10". That is, in cases where the application program executed by each of the nodes 5a to 5e is read-intensive, the determination unit 17 determines a threshold having a smaller value than in cases where the application program is write-intensive.

Note that, in the example described above, the determination unit 17 sets the threshold to "10" in the case where the application program executed by each of the nodes 5a to 5e is read-intensive, and sets the threshold to "30" in the case where the application program concerned is write-intensive. However, the embodiment is not limited to this. For example, the determination unit 17 may determine the threshold based on the ratio stored in the workload management table 13. For example, when, for an application program that is write-intensive, the proportion of written data stored in the workload management table 13 is larger than a predetermined value, the determination unit 17 may set the threshold to a value larger than "30".

Note that, when receiving a judgment result indicating the tendency of read/write access to each of the SSDs 6a to 6f, the determination unit 17 may determine a threshold used as a criterion for replacement of the SSDs 6a to 6f on the basis of the received judgment result. For example, when receiving a judgment result for the SSD 6a to the effect that the tendency of read/write access is read-intensive, the determination unit 17 determines that the threshold used as a criterion for replacement of the SSD 6a is "10". When receiving a judgment result for the SSD 6a to the effect that the tendency of read/write access is write-intensive, the determination unit 17 determines that the threshold used as a criterion for replacement of the SSD 6a is "30".

The selection unit 18 judges whether to replace an SSD or SSDs used by each of the nodes 5a to 5e, based on a threshold determined depending on the property of an application program. For example, the selection unit 18 receives, from the determination unit 17, a notification to the effect that the threshold used as a criterion for replacement of SSDs used by the node 5a is "30". Then, referring to the life-expectancy management table 12, the selection unit 18 identifies one or more SSDs used by the node 5a. Then, the selection unit 18 judges whether the life-expectancy index value of each of the identified SSDs is smaller than a threshold of "30". If the life-expectancy index value is smaller than "30", it is judged that the SSD is to be replaced.

If it is judged that the SSD is to be replaced, the selection unit 18 performs processing described below. For example, referring to the life-expectancy management table 12, the selection unit 18 extracts SSDs whose connection destinations are "NOT CONNECTED". Then, if the application program executed by the node 5a is read-intensive, the selection unit 18 searches the extracted SSDs for an SSD whose life-expectancy index value is larger than "10" and equal to or smaller than "30". Thereafter, if the selection unit 18 detects an SSD whose life-expectancy index value is larger than "10" and equal to or smaller than "30", the selection unit 18 notifies the setting unit 19 of the SSD ID of the SSD to be replaced among SSDs used by the node 5a and the SSD ID of the SSD detected from the life-expectancy management table 12.

If the selection unit 18 has not been able to detect an SSD whose life-expectancy index value is larger than "10" and equal to or smaller than "30", the selection unit 18 searches the extracted SSDs for an SSD whose life-expectancy index value is larger than "30". If the selection unit 18 detects an SSD whose life-expectancy index value is larger than "30", the selection unit 18 notifies the setting unit 19 of the SSD ID of an SSD to be replaced among SSDs used by the node 5a and the SSD ID of an SSD detected from the life-expectancy management table 12. Note that if the selection unit 18 has not been able to detect an SSD whose life-expectancy index value is larger than "30", the selection unit 18 gives an administrator or the like a notification to the effect that there is no SSD with which replacement may be performed.

If the application program executed by the node 5a is write-intensive, the selection unit 18 searches for an SSD whose life-expectancy index value is larger than "30". Then, if the selection unit 18 detects an SSD whose life-expectancy index value is larger than "30", the selection unit 18 notifies the setting unit 19 of the SSD ID of an SSD ID to be replaced among SSDs used by the node 5a and the SSD ID of an SSD detected from the life-expectancy management table 12.

Note that if the judgment unit 16 does not judge the property of the application program, the selection unit 18 may select an SSD to be replaced by performing processing similar to that described above. For example, in the case where the threshold is "10" for the SSD 6a and the life-expectancy index value of the SSD 6a is smaller than "10", the selection unit 18 selects an SSD whose life-expectancy index value is larger than "10" and equal to or less than "30" as an SSD with which the SSD 6a is to be replaced. In the case where the threshold is "30" for the SSD 6a and the life-expectancy index value of the SSD 6a is smaller than "30", the selection unit 18 selects an SSD whose life-expectancy index value is larger than "30" as an SSD with which the SSD 6a is to be replaced.

The setting unit 19 changes setting of SSDs used by each of the nodes 5a to 5e. For example, the setting unit 19 receives the SSD ID of the SSD 6a and the SSD ID of the SSD 6d from the selection unit 18. Referring to the workload management table 13, the setting unit 19 identifies the node 5a that is using the SSD 6a. Then, the setting unit 19 requests the identified node 5a to perform a procedure for closing connection to the SSD 6a. In such a case, the node 5a performs the procedure for closing connection to the SSD 6a to close the connection to the SSD 6a.

The setting unit 19 also instructs the disk area network 3 to close connection between the node 5a and the SSD 6a. As a result, the connection between the node 5a and the SSD 6a is closed. Referring to the workload management table 13, the setting unit 19 also identifies a node that is not executing an application program. For example, the setting unit 19 identifies the node 5c when the information illustrated in FIG. 5 is stored in the workload management table 13. Then, the setting unit 19 instructs the disk area network 3 to establish connection between the node 5c and the SSDs 6a and 6d. Then, the setting unit 19 requests the node 5c to replicate the data of the SSD 6a to the SSD 6d.

The node 5c replicates the data of the SSD 6a to the SSD 6d, and notifies the setting unit 19 of completion of replication. Then, the setting unit 19 instructs the disk area network 3 to close connection between the node 5c and the SSD 6d and establish connection between the node 5a and the SSD 6d. Then, the setting unit 19 requests the node 5a to perform a procedure for establishing connection to the SSD 6d. As a result, the node 5a continues executing the application program using the SSD 6d that stores the same data as the SSD 6a.

Note that, in a period of time from closure of connection to the SSD 6a to establishment of connection to the SSD 6d, the node 5a reads data from the SSD 6b. Additionally, when writing data, the node 5a buffers data to be written to a memory, and reflects the buffered data into the SSDs 6b and 6d after establishment of connection to the SSD 6d. Note that, if a buffer overflow occurs, the node 5a may write data to the SSD 6b and replicate data from the SSD 6b to the SSD 6d after establishment of connection to the SSD 6d.

Figure 6:
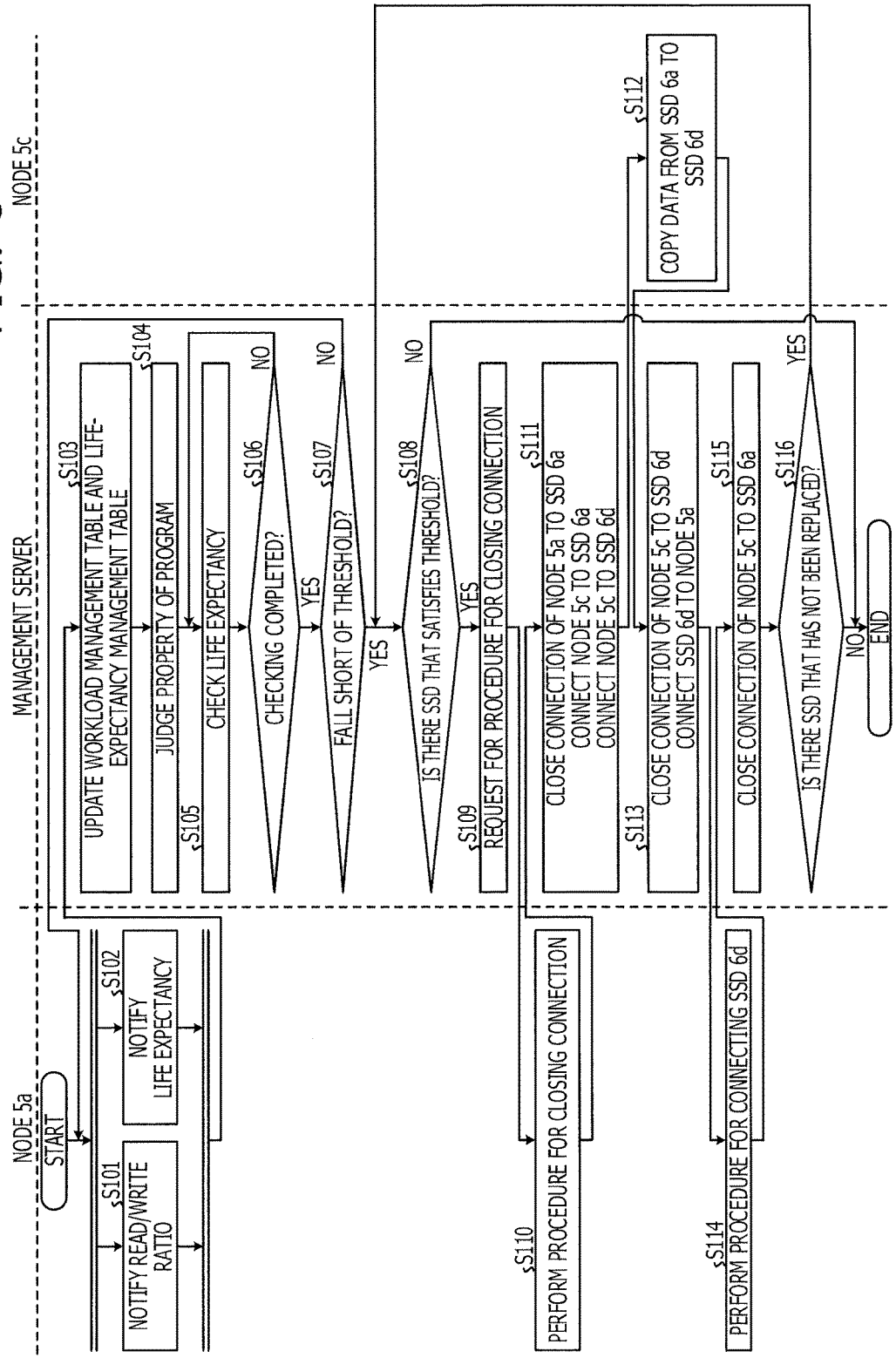
FIG. 6 is a flowchart for explaining a flow of processing performed by the information processing device according to the first embodiment.

With reference to FIG. 6, the flow of processing performed by the information processing device 1 according to the first embodiment will be described next. FIG. 6 is a flowchart for explaining the flow of processing performed by the information processing device according to the first embodiment. Note that the flow of processing in which the node 5a uses the SSDs 6a and 6b and replaces the SSD 6a with the SSD 6d will be described below. In the explanation described below, it is assumed that the node 5c is not executing an application program.

The node 5a monitors accesses to each SSD, and notifies the management server 10 of a read/write ratio, which is a ratio between the amount of read data and the written data, of accesses to each SSD (S101). The node 5a also confirms the life expectancies of the SSDs 6a and 6b in use, and sends the life-expectancy index values thereof to the management server 10 (S102). Then, the management server 10 updates the workload management table 13 and the life-expectancy management table 12, based on the received read/write ratio and life-expectancy index values (S103).

The management server 10 judges whether the application program executed by the node 5a is read-intensive or write-intensive, on the basis of the read/write ratio stored in the workload management table 13 (S104). Then, the management server 10 checks whether the life expectancies of the SSDs 6a and 6b connected to the node 5a each fall short of a threshold based on the property of the application program executed by the node 5a (S105).

The management server 10 judges whether checking of the life expectancy of SSD with the threshold based on the property of an application program has been completed for all the nodes that are executing application programs (S106). If checking of the life expectancy of SSD with the threshold based on the property of an application program has not been completed for all the nodes that are executing application programs (No at S106), the management server 10 performs processing described below. That is, the management server 10 performs S105 for each node that is executing an application program has not been checked for.

If checking of the life expectancy of SSD with the threshold based on the property of an application program has been completed for all the nodes that are executing application programs (Yes at S106), the management server 10 performs processing described below. That is, the management server 10 judges whether there is an SSD whose life-expectancy index value falls short of the threshold, that is, an SSD whose life-expectancy index value is smaller than the threshold (S107). If there is an SSD whose life-expectancy index value is smaller than the threshold (Yes at S107), the management server 10 judges whether there is an SSD that satisfies the threshold based on the property of the application program among SSDs not in use (S108).

If there is an SSD (the SSD 6d, for example) that satisfies the threshold based on the property of the application program among SSDs not in use (Yes at S108), the management server 10 performs processing described below. That is, the management server 10 requests a node (the node 5a, for example) that uses an SSD (the SSD 6a, for example) whose life expectancy falls short of the threshold, to perform a procedure for closing connection to the SSD (SSD 6a) (S109). Then, the node 5a performs the procedure for closing connection and notifies the management server 10 of completion of the procedure (S110).

Upon receipt of a notification of completion of the procedure for closing connection to the SSD 6a from the node 5a, the management server 10 performs an SSD replacement processing described below (S111). That is, the management server 10 instructs the disk area network 3, so that connection of the node 5a to the SSD 6a is closed and connection of a node (the node 5c, for example) that is not executing an application program to the SSDs 6a and 6d is established. After completion of the establishment of connection, the management server 10 notifies the node 5c of completion of the establishment of connection. Then, the node 5c performs copying of data from the SSD 6a to the SSD 6d, and notifies the management server 10 of completion of the copying (S112).

Then, the management server 10 closes connection of the node 5c to the SSD 6d, and connects the SSD 6d to the node 5a, and gives the node 5a a notification to the effect that connection to the SSD 6d has been established (S113). Then, the node 5a performs a procedure for connection to the SSD 6d (S114). The management server 10 closes connection of the node 5c to the SSD 6a (S115).

The management server 10 judges whether there is an SSD that falls short of the threshold and has not been replaced (S116). If there is no SSD that falls short of the threshold and has not been replaced (No at S116), the management server 10 completes the processing. If there is an SSD that falls short of the threshold and has not been replaced (Yes at S116), the management server 10 performs S108. Note that if there is no SSD that is not used and satisfies the threshold based on the property of the application program (No at S108), the management server 10 terminates the processing without doing anything.

Figure 7:
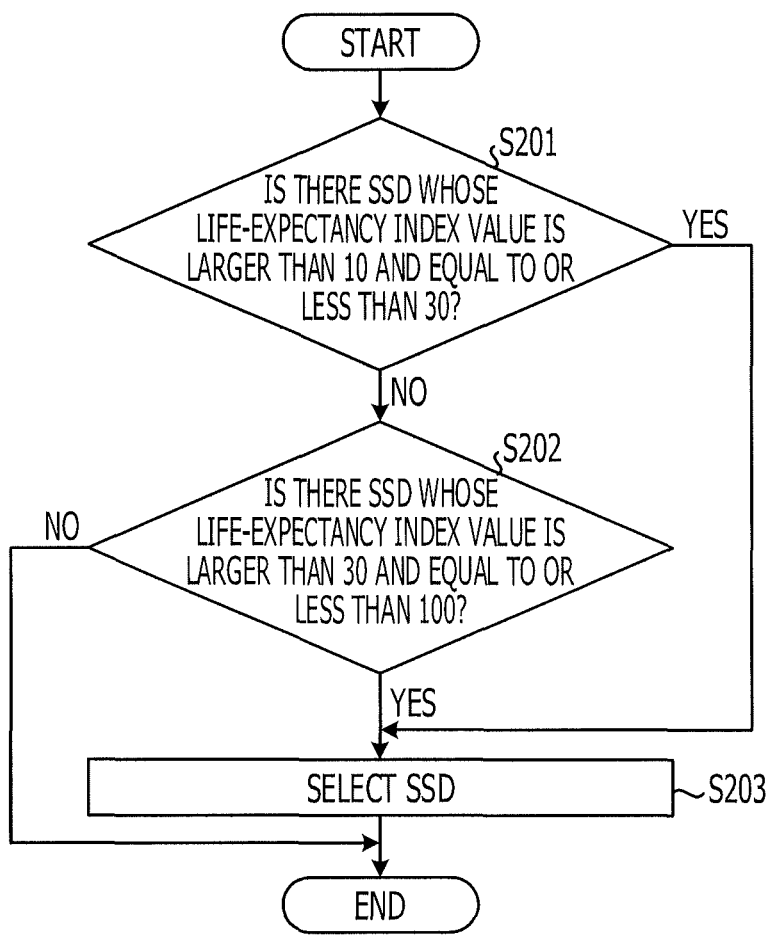
FIG. 7 is a first flowchart for explaining a flow of processing performed by a selection unit.
Figure 8:
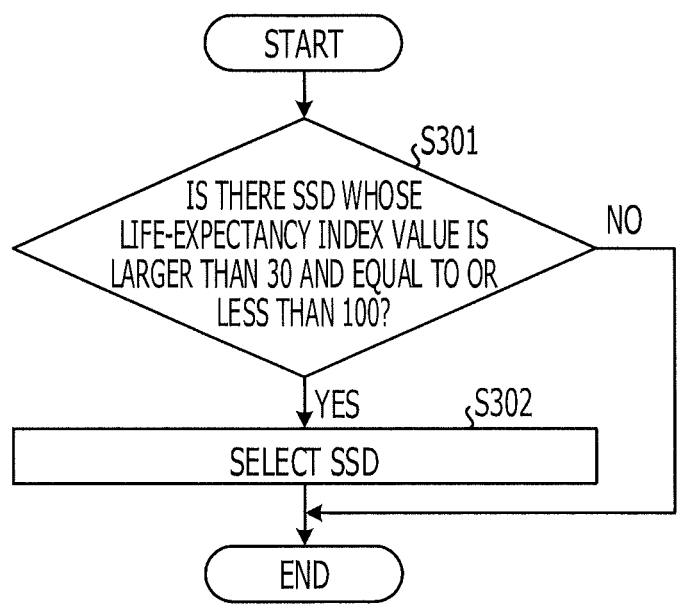
FIG. 8 is a second flowchart for explaining a flow of processing performed by the selection unit.

With reference to FIG. 7 and FIG. 8, the flow of processing of S108 in FIG. 6, that is, judging whether there is an SSD that satisfies a threshold based on the property of an application program among SSDs not in use, will be described next. First, with reference to FIG. 7, the flow of processing performed by the selection unit 18 when the property of an application program is read-intensive will be described.

FIG. 7 is a first flowchart for explaining the flow of processing performed by the selection unit 18. For example, the selection unit 18 judges whether there is an SSD whose life-expectancy index value is larger than "10" and equal to or less than "30" among SSDs not in use (S201). If there is no SSD whose life-expectancy index value is larger than "10" and equal to or less than "30" (No at S201), the selection unit 18 judges whether there is an SSD whose life-expectancy index value is larger than "30" and equal to or less than "100" (S202).

If there is an SSD whose life-expectancy index value is larger than "30" and equal to or less than "100" (Yes at S202), the selection unit 18 selects the SSD that satisfies the thresholds (S203) and terminates the processing. If there is an SSD whose life-expectancy index value is larger than "10" and equal to or less than "30" (Yes at S201), the selection unit 18 selects the SSD that satisfies the thresholds (S203) and terminates the processing. If there is no SSD whose life-expectancy index value is larger than "30" and equal to or less than "100" (No at S202), the selection unit 18 terminates the processing without selecting an SSD.

Then, with reference to FIG. 8, the flow of processing performed by the selection unit 18 when the property of an application program is write-intensive will be described. FIG. 8 is a second flowchart for explaining the flow of processing performed by the selection unit 18. For example, if the property of an application program is write-intensive, the selection unit 18 judges whether there is an SSD whose life-expectancy index value is larger than "30" and equal to or less than "100" among SSDs not in use (S301).

If there is an SSD whose life-expectancy index value is larger than "30" and equal to or less than "100" among SSDs not in use (Yes at S301), the selection unit 18 selects the SSD that satisfies the thresholds (S302) and terminates the processing. If there is no SSD whose life-expectancy index value is larger than "30" and equal to or less than "100" among SSDs not in use (No at S301), the selection unit 18 terminates the processing without selecting an SSD.

As described above, the information processing device 1 includes the SSD 6a and, for example, the SSD 6f, which is a substitute for the SSD 6a. The information processing device 1 collects the life-expectancy index value for the SSD 6a and the amounts of data read from and written to the SSD 6a, and calculates the ratio. Then, on the basis of the calculated ratio, the information processing device 1 determines a threshold used as a criterion for replacement. Thereafter, if the collected life-expectancy index value is less than the determined threshold, the information processing device 1 replaces the SSD 6a with the SSD 6f. Therefore, the information processing device 1 may cause the node 5a to continuously use the SSDs 6a to 6f as storage devices.

Additionally, since the information processing device 1 judges replacement of the SSD 6a using a threshold based on the ratio between the amounts of data read from and written to the SSD 6a, the information processing device 1 may use each of the SSDs 6a to 6f until the very end of the life expectancy thereof. As a result, the information processing device 1 may make the utmost use of the lifetime of each of the SSDs 6a to 6f as storage.

Note that the information processing device 1 may judge the property of an application program executed by the node 5a, based on the calculated ratio, and may determine a threshold used as a criterion for replacement of the SSD 6a used by the node 5a, depending on the judged property of the application program. Thereafter, the information processing device 1 replaces the SSD 6a with another SSD if the collected life-expectancy index value is less than the determined threshold. In such a case, the information processing device 1 may also cause the node 5a to continuously use the SSDs 6a to 6f as storage devices.

Additionally, the information processing device 1 may replace an SSD using a threshold determined depending on the property of an application program executed by the node 5a. In such a case, the information processing device 1 may also use each of the SSDs 6a to 6f until the very end of the life expectancy thereof and may make the utmost use of the lifetime of each of the SSDs 6a to 6f when used as storage.

In a write-intensive case, the information processing device 1 sets, as a threshold used as the criterion for replacement, a second threshold having a larger value than a first threshold that is set in a read-intensive case. Thus, the information processing device 1 assigns an SSD having a long life expectancy to a node that writes data very frequently at the time of execution of an application program, and assigns an SSD having a short life expectancy to a node that reads data very frequently at the time of execution of an application program. As a result, the information processing device 1 may make the utmost use of the life of each of the SSDs 6a to 6f.

Note that the information processing device 1 may judge whether the property of an application program executed by the node 5a is read-intensive or write-intensive. Then, if the application program is write-intensive, the information processing device 1 may use a threshold having a larger value than a threshold used when the application program is read-intensive.

The information processing device 1 includes a plurality of SSDs not in use, that is, standby SSDs and selects an SSD that satisfies conditions given below, among the SSDs not in use, when replacing the SSD 6a. That is, if the tendency of read/write access to the SSD 6a is read-intensive, the information processing device 1 selects an SSD whose life-expectancy index value is larger than the first threshold and smaller than the second threshold among standby SSDs. Then, the information processing device 1 replaces the SSD 6a with the selected SSD. This enables the information processing device 1 to use an SSD having a short life-expectancy in preference to other SSDs among SSDs not in use.

If the property of an application program executed by the node 5a is read-intensive, the information processing device 1 may select an SSD that satisfies conditions given below among SSDs not in use. That is, the information processing device 1 may select an SSD whose life-expectancy index value is larger than a threshold set when the property of the application program is read-intensive and is smaller than a threshold set when the property of the application program is write-intensive.

If the tendency of read/write access to the SSD 6a is write-intensive, the information processing device 1 selects an SSD whose life-expectancy index value is larger than the second threshold. Then, the information processing device 1 replaces the SSD 6a with the selected SSD. This enables the information processing device 1 to assign an SSD having a sufficient life expectancy to a node that writes data very frequently at the time of execution of an application program. As a result, the information processing device 1 may inhibit a situation where the life expectancies of the SSDs 6a to 6f reach their ends and therefore the SSD used by each of the nodes 5a to 5e suddenly becomes unavailable. Thus, the information processing device 1 may execute an application program stably.

If the property of an application program executed by the node 5a is write-intensive, the information processing device 1 may select an SSD that satisfies conditions given below, among SSDs not in use. That is, the information processing device 1 selects an SSD whose life-expectancy index value is larger than a threshold set when the property of an application program is write-intensive. Then, the information processing device 1 may replace an SSD used by the node 5a with the selected SSD.

Additionally, the information processing device 1 may judge that the tendency of read/write access to the SSD 6a is read-intensive if the amount of data read from the SSD 6a per unit period of time is larger than a predetermined threshold. This enables the information processing device 1 to assign an SSD having a small life-expectancy index value to a node from which a large amount of data is read at the time of execution of an application program.

If the amount of data read when the node 5a executes an application program is larger than a predetermined threshold, the information processing device 1 may judge that the application program executed by the node 5a is read-intensive. Then, the information processing device 1 may assign an SSD having a small life-expectancy index value to a node that executes a read-intensive application program.

If the information processing device 1 replaces the SSD 6a with the SSD 6d when the node 5a performs mirroring with the SSD 6a and the SSD 6b using RAID-1 configuration, the information processing device 1 performs processing described below. That is, the information processing device 1 holds data to be written from the node 5*a* into the SSDs 6*a* and 6*b* in a memory until the SSD 6*a* is replaced with the SSD 6*d*. Then, the information processing device 1 replicates the data of the SSD 6*a* to the SSD 6*d*, and replicates the data held in the memory to the SSDs 6*b* and 6*d*. Thus, the information processing device 1 may perform replacement of SSDs while the node 5*a* is executing an application program.

In this way, the information processing device 1 judges whether to replace each of the SSDs 6*a* to 6*f* until the life expectancies of the SSDs 6*a* to 6*f* reach their ends. Here, a plurality of nodes 5*a* to 5*e* are placed in the information processing device 1, and application programs executed by the nodes 5*a* to 5*e* have properties that vary from one another. For this reason, when each of the nodes 5*a* to 5*e* makes mirroring using RAID-1 configuration, deviation will occur among life expectancies of the SSDs 6*a* to 6*f*. According to the present embodiment, even when the node 5*a* uses SSDs on which mirroring is performed using RAID-1 configuration, the information processing device 1 may effectively make use of each of the SSDs 6*a* to 6*f* over a long time.

Other Embodiments

Although the first embodiment has been described above, embodiments may be carried out in various different forms other than the first embodiment described above. Accordingly, other embodiments will be described below.

Other RAID Configurations

In the information processing device 1 described above, the node 5*a* copies data of the SSDs 6*a* and 6*b* by mirroring using RAID-1 configuration. However, embodiments are not limited to this. For example, the node 5*a* may utilize RAID-5 configuration in which data and parity for reconstructing data are stored in a distributed manner in five SSDs. The node 5*a* may also utilize RAID-6 configuration in which data and parity for reconstructing data are stored in a distributed manner in six SSDs.

In this way, when the node 5*a* utilizes RAID-5 or RAID-6 configuration, the information processing device 1 does not have to replicate data stored in an SSD to be replaced. For example, in the case where the information processing device 1 replaces the SSD 6*a* with the SSD 6*f* when the node 5*a* utilizes RAID-5 configuration with the SSDs 6*a* to 6*e*, data to be stored in the SSD 6*f* is able to be reconstructed from the SSDs 6*b* to 6*e*.

For this reason, when replacing the SSD 6*a* being used by the node 5*a* with the SSD 6*f*, the information processing device 1 closes connection between the SSD 6*a* and the node 5*a*. Then, the information processing device 1 establishes connection between the SSD 6*f* and the node 5*a* without replicating data from the SSD 6*a* to the SSD 6*f*. As a result, the node 5*a* reconstructs data to be stored in the SSD 6*f* from that in the SSDs 6*b* to 6*e* owing to functions of RAID-5. Also, owing to functions of RAID-5, the node 5*a* is able to continue reading data while replacing the SSD 6*a* with the SSD 6*f*, and data has not to be buffered for writing of data. Thus, the node 5*a* may continuously execute an application program while replacing the SSD 6*a* with the SSD 6*f*.

Figure 9:
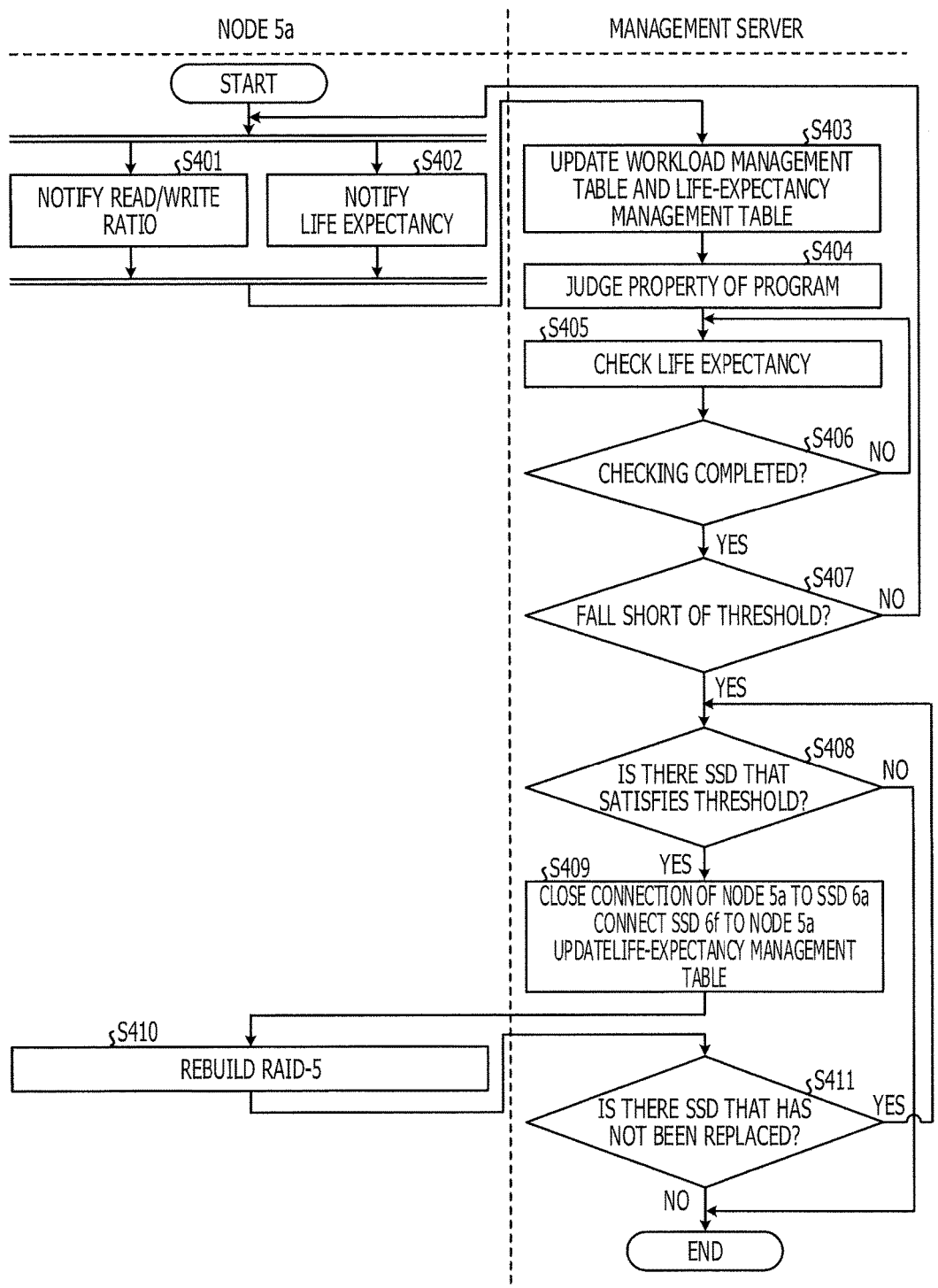
FIG. 9 is a flowchart for explaining a flow of processing performed by an information processing device according to a second embodiment.

With reference to FIG. 9, the flow of processing performed by the information processing device 1 for the node 5*a* that utilizes RAID-5 configuration will be described next. FIG. 9 is a flowchart for explaining the flow of processing performed by an information processing device according to the second embodiment. Note that S401 to S408 in the processing illustrated in FIG. 9 are similar to S101 to S108 illustrated in FIG. 6, and therefore will not be further discussed. In the description given below, the flow of processing in which the node 5*a* utilizes RAID-5 configuration with the SSDs 6*a* to 6*e* and replaces the SSD 6*a* with the SSD 6*f* that satisfies a threshold depending on the property of an application program executed by the node 5*a* will be explained.

The management server 10 closes connection of the node 5*a* to the SSD 6*a*, connects the SSD 6*f* to the node 5*a*, updates the life-expectancy management table 12, and then gives the node 5*a* a notification to the effect that connection to the SSD 6*f* has been established (S409). The node 5*a* reconstructs data to be stored in the SSD 6*f* using the SSDs 6*b* to 6*e*, and reconstructs RAID-5 with the SSDs 6*b* to 6*f*. Then, the node 5*a* gives the management server 10 a notification to the effect that reconstruction of RAID-5 has been completed (S410). The management server 10 judges whether there is an SSD that falls short of a threshold and has not been replaced (S411). If there is no SSD that falls short of the threshold and has not been replaced (No at S411), the management server 10 completes the processing. If there is an SSD that falls short of the threshold and has not been replaced (Yes at S411), the management server 10 performs S408.

In this way, in the case where data and parity for reconstructing data are stored in the SSDs 6*a* to 6*e* used by the node 5*a*, the information processing device 1 executes processing given below when replacing any of the SSDs 6*a* to 6*e*. For example, the information processing device 1 replaces the SSD 6*a* with the SSD 6*f*, and reconstructs data to be stored in the SSD 6*f* using data and parity stored in the SSDs 6*b* to 6*f*. Thus, without replicating data of an SDD to be replaced, the information processing device 1 may replace the SSD while the node 5*a* is executing an application program.

Configuration of Information Processing Device

In the first embodiment described above, an example where an arbitrary SSD among the SSDs 6*a* to 6*e* contained in the disk pool 4 is connected via the disk area network 3 to each of the nodes 5*a* to 5*e* contained in the CPU pool 2 has been described. However, embodiments are not limited to this. For example, the information processing device 1 may connect the nodes 5*a* to 5*e* and the SSDs 6*a* to 6*e* using a storage area network (SAN) instead of the disk area network 3. Additionally, the information processing device 1 may cause not only SSDs but also arbitrary devices such as hard disk drives (HDDs) to be contained as storage in the disk pool 4.

Property of Application Program

In the first embodiment described above, the management server 10 judges the property of an application program on the basis of the ratio between the amounts of data read and written by execution of the application program. However, embodiments are not limited to this. For example, the management server 10 may judge the property of an application program in consideration of not only the ratio between the amounts of data read and written by execution of the application program but also, for example, a normal amount of data of writing.

The management server 10 may take the number of nodes executing application programs into consideration. Additionally, the management server 10 does not necessarily have to judge the property of an application program. That is, the management server 10 may directly set a threshold used as an index for replacement, based on the ratio between the amounts of data read from and written to each of the SSDs 6*a* to 6*e*, and perform replacement of each of the SSDs 6*a* to 6*e*.

Combination of RAIDs

The example where the node 5a utilizes RAID-1 configuration has been described in the first embodiment described above, and the example where the node 5a utilizes RAID-5 configuration has been described in the second embodiment. However, embodiments are not limited to these examples. For example, the information processing device 1 may perform processing illustrated in FIG. 6 for the node 5a and perform processing illustrated in FIG. 9 for the node 5b when the node 5a utilizes RAID-1 configuration and the node 5b utilizes RAID-5 or RAID-6 configuration.

Information Collected

In the first embodiment described above, the management server 10 collects the amounts of data read and written per unit period of time. However, embodiments are not limited to this, and, the management server 10 may collect the number of times per unit period of time data is read from and the number of times per unit period of time data is written to each of the nodes 5a to 5e, for example. Then, the management server 10 may judge that the application program is read-intensive if the number of times data is read is larger than a predetermined threshold. Alternatively, the management server 10 may judge whether the application program is read-intensive or write-intensive, based on the ratio between the number of times data is read and the number of times data is written.

The information processing device 1 may determine that the tendency of read/write access to the SSD 6a is read-intensive if the number of times data is read from the SSD 6a is larger than a threshold when the node 5a executes an application program. Thus, the information processing device 1 may assign an SSD whose life-expectancy index value is small to a node that reads data many times when executing an application program.

Program

Figure 10:
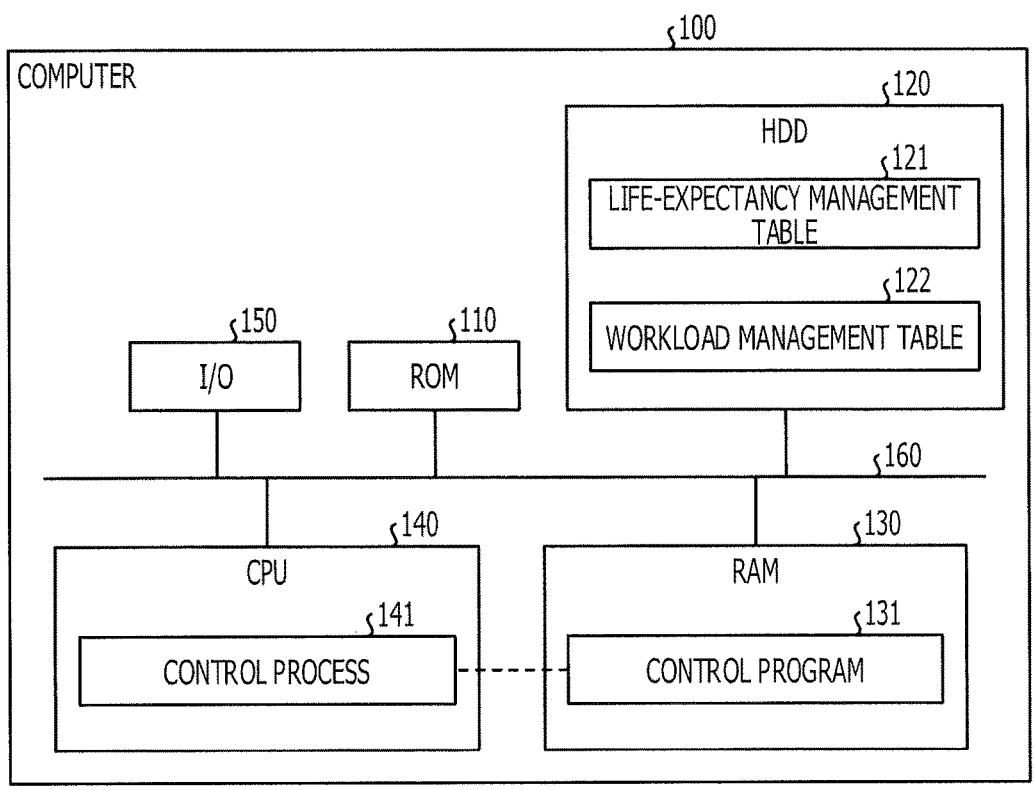
FIG. 10 is a block diagram for explaining a computer that executes a control program.

As described above, the management server 10 according to the first embodiment implements various kinds of processing utilizing a dedicated hard-wired logic circuit or a processor executing a program. For example, a program may be prepared in advance and executed by a computer such as a personal computer or a workstation. Accordingly, with reference to FIG. 10, an example of a computer that executes a program having functions similar to those of the management server 10 illustrated in the first embodiment will be described below. FIG. 10 is a block diagram for explaining a computer that executes a control program.

In a computer 100 illustrated in FIG. 10, a read only memory (ROM) 110, an HDD 120, a random access memory (RAM) 130, and a CPU 140 are connected by a bus 160. The computer 100 illustrated in FIG. 10 also includes an input output interface (I/O) 150 for sending and receiving packets.

The HDD 120 stores therein a life-expectancy management table 121, which is information similar to the life-expectancy management table 12 stored in the storage unit 11 illustrated in FIG. 3, and a workload management table 122, which is information similar to the workload management table 13. A control program 131 is held in advance in the RAM 130. By reading the control program 131 from the RAM 130 and executing the control program 131, the CPU 140 functions as a control process 141, in the example illustrated in FIG. 10. The control process 141 performs functions similar to those of the updating unit 15, the judgment unit 16, the determination unit 17, the selection unit 18, and the setting unit 19 illustrated in FIG. 3.

The control program may be distributed via networks, such as the Internet. Additionally, the program is recoded on a computer-readable recording medium such as a hard disk, a flexible disk (FD), a compact disc read only memory (CD-ROM), a magneto optical (MO) disc, or a digital versatile disc (DVD). The computer may read the program from the recording medium to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a plurality of semiconductor storage devices from and to which data is read and written; and
a processor or hard-wired logic circuit configured to
collect a life-expectancy index value of a first semiconductor storage device of a plurality of semiconductor storage devices, the life-expectancy index value relating to a remaining number of times written data is able to be erased;
collect read/write information for an application program which is assigned to use the first semiconductor storage device, the read/write information relating to read access of reading data from the first semiconductor storage device and write access of writing data to the first semiconductor storage device in connection with the application program;
determine, based on the collected read/write information, whether the application program is read-intensive or write-intensive;
set a first threshold as a criterion threshold if the application program is read-intensive and set a second threshold as the criterion threshold if the application program is write-intensive, the second threshold being greater than the first threshold; and
reassign the application program from the first semiconductor storage device to a second semiconductor storage device of the plurality of semiconductor storage devices if the life-expectancy index value of the first semiconductor storage device is less than the criterion threshold.

2. The information processing device according to claim 1, wherein the processor or hard-wired logic circuit is configured to
set the first threshold as the criterion threshold when it is judged, based on the collected read/write information, that the read access is frequently performed, and
set the second threshold as the criterion threshold when it is judged, based on the collected read/write information, that the write access is frequently performed.

3. The information processing device according to claim 2, wherein
the life-expectancy index value of the second semiconductor storage device is larger than the first threshold and smaller than the second threshold when it is judged that the read access is frequently performed.

4. The information processing device according to claim 2, wherein the life-expectancy index value of the second semiconductor storage device is larger than the second threshold when it is judged that the write access is frequently performed.

5. The information processing device according to claim 1, wherein
the read/write information includes a first amount of data read from the first semiconductor storage device per unit period of time, and
the processor or hard-wired logic circuit is configured to judge that the read access is frequently performed if the first amount is larger than a predetermined threshold.

6. The information processing device according to claim 1, wherein
the read/write information includes a first number of times data is read from the first semiconductor storage device per unit period of time, and
the processor or hard-wired logic circuit is configured to judge that the read access is frequently performed if the first number is larger than a predetermined threshold.

7. The information processing device according to claim 1, wherein
the read/write information includes a first amount of data read from the first semiconductor storage device and a second amount of data written to the first semiconductor storage device per unit period of time, and
the processor or hard-wired logic circuit is configured to judge that the read access is frequently performed if the first amount is larger than the second amount.

8. The information processing device according to claim 1, wherein
the read/write information includes a first number of times data is read from the first semiconductor storage device and a second number of times data is written to the first semiconductor storage device per unit period of time, and
the processor or hard-wired logic circuit is configured to judge that the read access is frequently performed if the first number is larger than the second number.

9. The information processing device according to claim 1, wherein
the read/write information includes a first amount of data read from the first semiconductor storage device and a second amount of data written to the first semiconductor storage device per unit period of time, and
the processor or hard-wired logic circuit is configured to calculate a proportion of the first amount to a sum of the first amount and the second amount, and
judge that the read access is frequently performed if the proportion is larger than a predetermined threshold.

10. The information processing device according to claim 1, wherein
the read/write information includes a first number of times data is read from the first semiconductor storage device and a second number of times data is written to the first semiconductor storage device per unit period of time, and
the processor or hard-wired logic circuit is configured to calculate a proportion of the first number to a sum of the first number and the second number, and
judge that the read access is frequently performed if the proportion is larger than a predetermined threshold.

11. The information processing device according to claim 1, further comprising
a buffer storage device,
wherein
the first semiconductor storage device is duplexed with a third semiconductor storage device of the primary semiconductor storage devices, and
the processor or hard-wired logic circuit is configured to
store, while replacing the first semiconductor storage device with the second semiconductor storage device, data to be written to the first semiconductor storage device in the buffer storage device, and
replicate, upon the replacement, data previously stored in the first semiconductor storage device and data stored in the buffer storage device to the second semiconductor storage device and the third semiconductor storage device.

12. The information processing device according to claim 1, wherein
stored data and parity for reconstructing the stored data are stored in a distributed manner in the first semiconductor storage device and other semiconductor storage devices of the primary semiconductor storage devices, and
the processor or hard-wired logic circuit is configured to generate, upon replacement of the first semiconductor storage device with the second semiconductor storage device, data to be stored in the second semiconductor storage device using data and parity stored in the other semiconductor storage devices.

13. A non-transitory computer-readable recording medium having stored therein a program for causing a computer to execute a process, the process comprising:
collecting a life-expectancy index value of a first semiconductor storage device of a plurality of semiconductor storage devices, the life-expectancy index value relating to a remaining number of times written data is able to be erased;
collecting read/write information for an application program which is assigned to use the first semiconductor storage device, the read/write information relating to read access of reading data from the first semiconductor storage device and write access of writing data to the first semiconductor storage device in connection with the application program;
determining, based on the collected read/write information, whether the application program is read-intensive or write-intensive;
setting a first threshold as a criterion threshold if the application program is read-intensive and setting a second threshold as the criterion threshold if the application program is write-intensive, the second threshold being greater than the first threshold; and
reassigning the application program from the first semiconductor storage device to a second semiconductor storage device of the plurality of semiconductor storage devices if the life-expectancy index value of the first semiconductor storage device is less than the criterion threshold.

14. A method for controlling replacement of a semiconductor storage device, the method comprising:
collecting, by an information processing device, a life-expectancy index value of a first semiconductor storage device of a plurality of semiconductor storage devices, the life-expectancy index value relating to a remaining number of times written data is able to be erased;
collecting read/write information for an application program which is assigned to use the first semiconductor storage device, the read/write information relating to read access of reading data from the first semiconductor storage device and write access of writing data to the first semiconductor storage device in connection with the application program;

determining, based on the collected read/write information, whether the application program is read-intensive or write-intensive;

setting a first threshold as a criterion threshold if the application program is read-intensive and setting a second threshold as the criterion threshold if the application program is write-intensive, the second threshold being greater than the first threshold; and reassigning the application program from the first semiconductor storage device to a second semiconductor storage device of the plurality of semiconductor storage devices if the life-expectancy index value of the first semiconductor storage device is less than the criterion threshold.

* * * * *